United States Patent [19]
Baughman et al.

[11] Patent Number: 6,016,049
[45] Date of Patent: Jan. 18, 2000

[54] CAPACITIVE SUPERCHARGER FOR ELECTRIC SHIFT MECHANISM

[75] Inventors: James Baughman, Redford; Douglas J. Wheeler, Farmington Hills, both of Mich.

[73] Assignee: Teleflex Incorporated, Plymouth Meeting, Pa.

[21] Appl. No.: 09/103,747

[22] Filed: Jun. 24, 1998

[51] Int. Cl.[7] .............................. H02J 7/00; B60K 41/12; F16H 59/00
[52] U.S. Cl. ................................ 320/167; 477/34; 74/335
[58] Field of Search .................................. 320/167, 117; 477/34; 74/335

[56] References Cited

U.S. PATENT DOCUMENTS

| | | |
|---|---|---|
| 5,119,010 | 6/1992 | Shirata et al. . |
| 5,225,761 | 7/1993 | Albright .................................. 320/117 |
| 5,243,522 | 9/1993 | Salzmann . |
| 5,260,637 | 11/1993 | Pizzi . |
| 5,318,142 | 6/1994 | Bates et al. ............................. 180/65.2 |
| 5,446,365 | 8/1995 | Nomura et al. . |
| 5,528,121 | 6/1996 | Okamura . |

*Primary Examiner*—Peter S. Wong
*Assistant Examiner*—Gregory J. Toatley, Jr.
*Attorney, Agent, or Firm*—Howard & Howard

[57] ABSTRACT

The invention provides a method of and an implementing assembly for shifting the transmission 12 of a vehicle having a battery 24 between park and various shift positions with a reversible motor 10 by supplying electrical energy from the battery 24 to the motor 10 to shift the transmission 12 in response to a shift selection 14 and characterized by storing electrical energy in a super capacitor 20 and transmitting that electrical energy stored in the capacitor 20 to the motor 10 for actuating the motor 10. The capacitor is placed in parallel with the battery 24 for charging the capacitor and in series with the battery 24 and the motor 10 to transmit the stored energy of the capacitor to the motor 10. The capacitor 20 stores sufficient electrical energy to actuate the motor 10 independently of the battery 24.

15 Claims, 2 Drawing Sheets

6,016,049

CAPACITIVE SUPERCHARGER FOR ELECTRIC SHIFT MECHANISM

BACKGROUND OF THE INVENTION

1. Field of the Invention

The subject invention relates to an improved system for supplying electrical energy to an actuator which positions the transmission of an automotive vehicle between park and various shift positions.

2. Description of the Prior Art

Normally, a vehicle operator moves the shift selector to the desired position and an electrical signal is generated to supply electrical power from the vehicle battery to a motor, i.e., actuator, to shift the transmission. However, in the event the vehicle battery is dead, i.e., fully discharged, there is insufficient electrical power for energizing the motor to shift the transmission. This is particularly a problem when the transmission is in the park position and a heavy load is on the transmission, thereby making it very difficult to move the transmission out of the park position. Under such heavy loads, the motor could be supplied with additional electrical energy to overcome such forces.

It is well known to use capacitors to store electrical energy for later discharge to energize an accessory; however, it was left to applicants to solve this transmission shifting problems by using a capacitor. Examples of such prior uses are shown in U.S. Pat. No. 5,119,010 to Shirata et al, U.S. Pat. No. 5,243,522 to Salzmann and U.S. Pat. No. 5,260,637 to Pizzi.

SUMMARY OF THE INVENTION AND ADVANTAGES

The subject invention provides an improved method of shifting the transmission of a vehicle having a battery between park and various shift positions with a reversible motor. The method comprises the well known step of supplying electrical energy from the battery to the motor to shift the transmission in response to a shift selection but is characterized by storing electrical energy in a super capacitor and transmitting that electrical energy to the motor for actuating the motor.

An assembly for performing the method of electrically controlling the shifting of a transmission in an automotive vehicle comprises an electric motor for shifting the transmission between park and various shift positions, an operator controlled selector device for selecting one of park and the various shift positions, and a motor control circuit for transmitting electrical signals from the selector device to the electric motor to actuate the motor. The assembly characterized is by a capacitor circuit for storing electrical energy to actuate the motor in response to signals form the motor control circuit.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
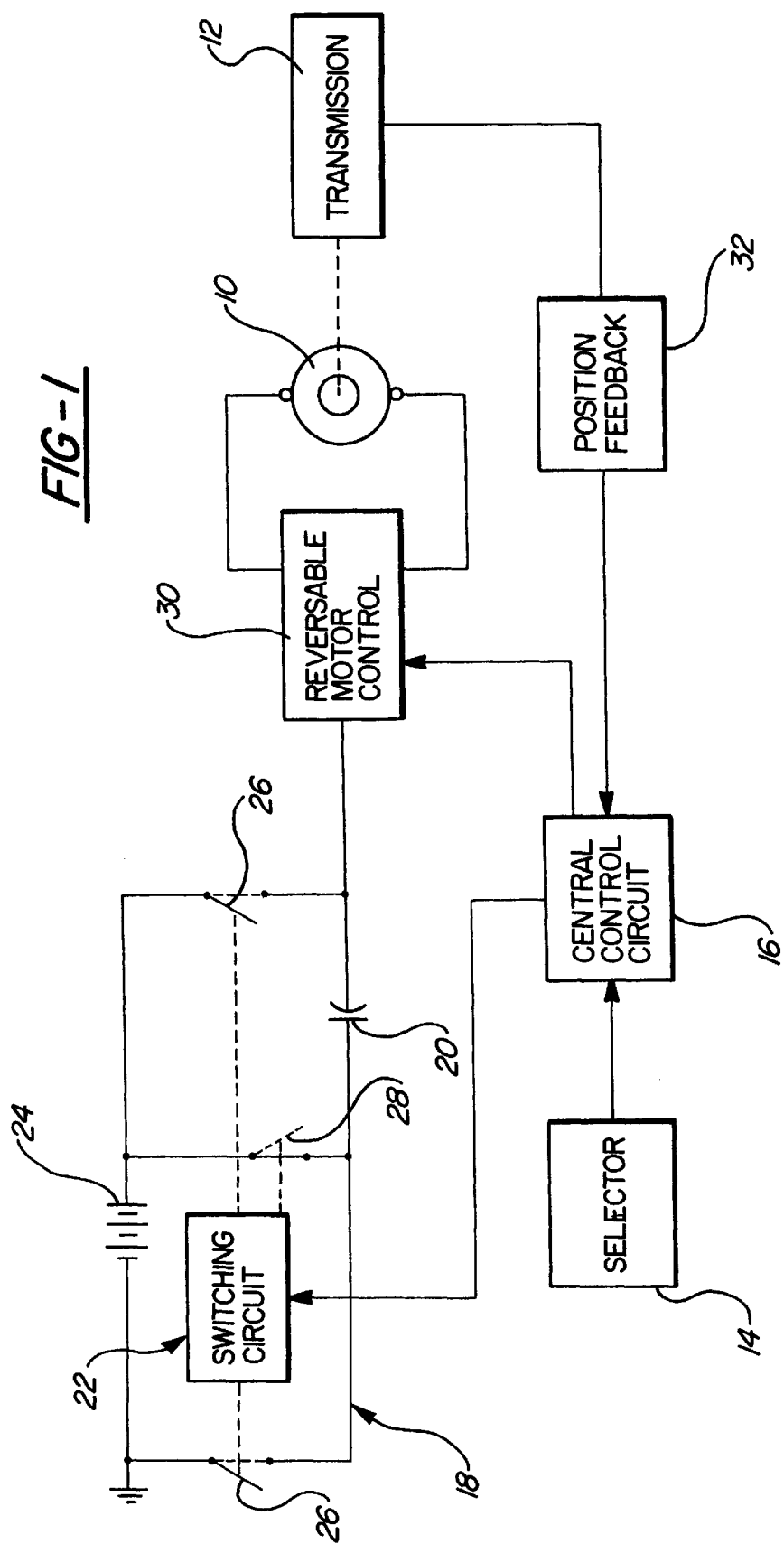
FIG. 1 is a schematic view of the subject invention.

Referring to the Figures, wherein like numerals indicate like or corresponding parts throughout the several views, an assembly for electrically controlling the shifting of a transmission in an automotive vehicle is schematically shown in FIG. 1.

The assembly includes an electric motor 10 for shifting the transmission 12 of a vehicle between park and various shift positions, as is well known. An operator controlled selector device 14 is moved by the vehicle operator for selecting one of park and the various shift positions. Such a selector device 14 is the shift lever of an automobile, whether mounted on the steering column or on a center console. A central control circuit 16 is included for controlling the transmission of electrical signals from the selector device 14 to the electric motor 10 to actuate the motor 10.

Figure 2:
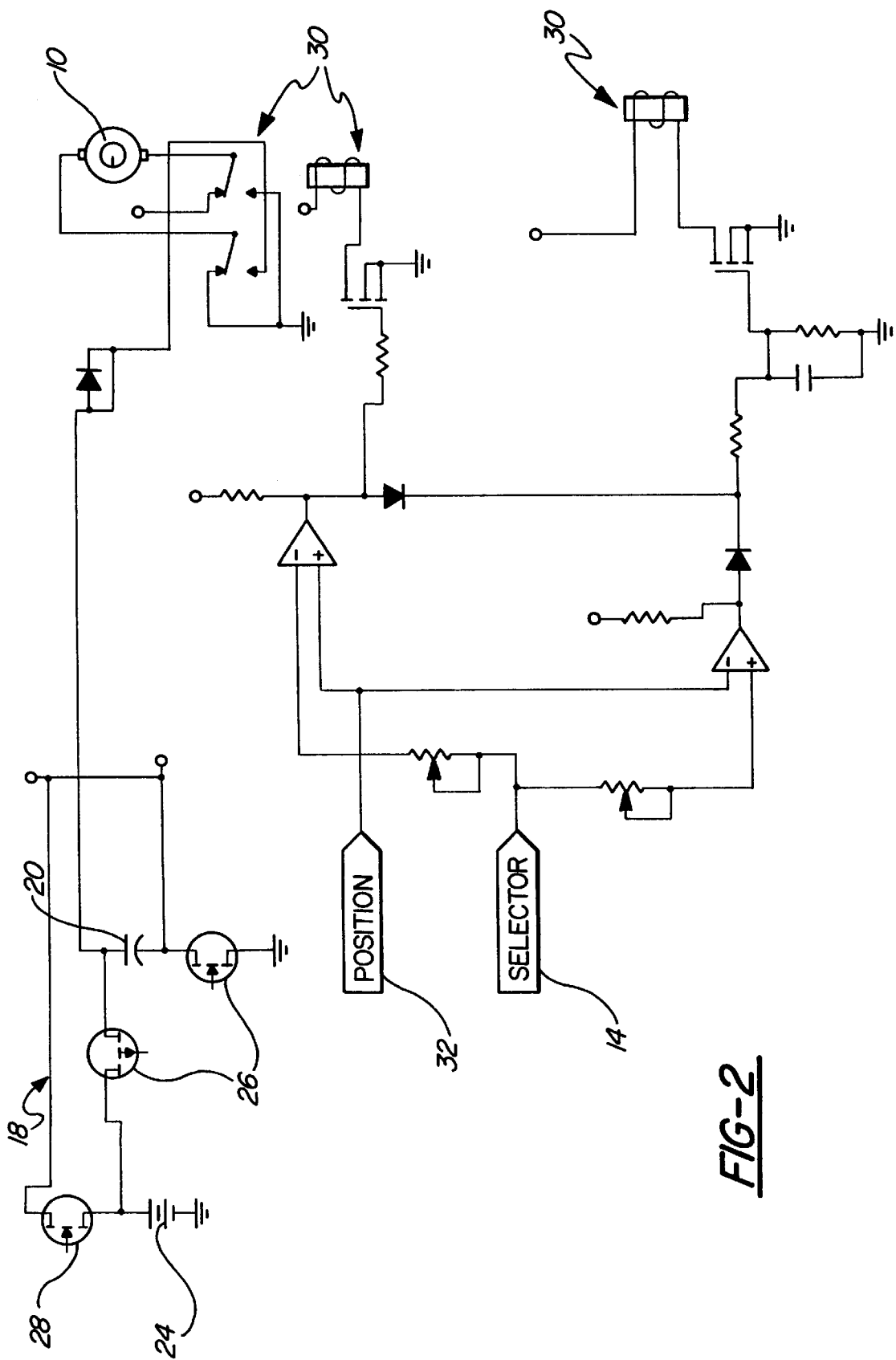
FIG. 2 is view of a circuit which may be employed in the subject invention.

The assembly is characterized by a capacitor circuit, generally shown at 18, for storing electrical energy to actuate the motor 10 in response to signals from the central control circuit 16. The capacitor circuit 18 includes a super capacitor 20 and a switching circuit 22 for placing the super capacitor 20 in parallel with a battery 24 for charging of the super capacitor 20 and for placing the super capacitor 20 in series with the battery 24 and the motor 10 for discharging the super capacitor 20 to the motor 10. More specifically, the switching circuit 22 includes two switches 26, e.g., transistors as shown in FIG. 2, operated in unison between closed positions, as shown in phantom lines in FIG. 1, to place the super capacitor 20 in parallel with the battery 24 to charge the super capacitor 20, and open positions as shown in full lines as a series switch 28, which is open when the switches 26 are closed, is closed to place the super capacitor 20 in series with the battery 24.

The motor 10 is a reversible motor 10 and a motor control 30 is included for controlling the direction of movement of the motor 10. The central control circuit 16 also controls the switching circuit 22 and the motor control circuit 16.

A position feedback circuit 32 is included for sensing the position of the transmission 12 and feeding a signal to the central control circuit 16. In this manner, the selected position of the transmission is assured, i.e., the motor is moved to the selected position.

It is important that the super capacitor 20 has an energy capacity sufficient to actuate the motor 10 independently of the battery 24. In the event the battery is dead, the super capacitor 20 will have sufficient energy to move the motor 10 to the selected position. In the normal operating condition, the super capacitor 20 increases the power supplied by the battery 24 to overcome the loads associated with friction with friction and pull out of the park position. This increased torque for starting also allows the overall motor size to be reduced to thereby lower the cost of the motor.

Accordingly, the invention provides a method of shifting the transmission 12 of a vehicle having a battery 24 between park and various shift positions with a reversible motor 10 by supplying electrical energy from the battery 24 to the motor 10 to shift the transmission 12 in response to a shift selection 14 and characterized by storing electrical energy in a super capacitor 20 and transmitting that electrical energy stored in the capacitor 20 to the motor 10 for actuating the motor 10. In further definition, the capacitor is placed in parallel with the battery 24 for charging the capacitor and in series with the battery 24 and the motor 10 to transmit the stored energy of the capacitor to the motor 10. The storing step is further defined as storing sufficient electrical energy in the capacitor 20 to actuate the motor 10 independently of the battery 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly for electrically controlling the shifting of a transmission (12) in an automotive vehicle, said assembly comprising;

an electric motor (10) for shifting the transmission (12) between park and various shift positions, an operator controlled selector device (14) for selecting one of park and the various shift positions, a central control circuit (16) for controlling the transmission of electrical signals from said selector device (14) to said electric motor (10) to actuate said motor (10), said assembly characterized by a capacitor circuit (18) for storing electrical energy to actuate said motor (10) in response to signals from said central control circuit (16) when additional energy is required to shift the transmission (12) from park to another shift position.

2. An assembly as set forth in claim 1 wherein said capacitor circuit (18) includes a super capacitor (20) and a switching circuit (22) for placing said super capacitor (20) in parallel with a battery (24) for charging of said super capacitor (20) and for placing said super capacitor (20) in series with the battery (24) and said motor (10) for discharging said super capacitor.

3. An assembly as set forth in claim 2 wherein said motor (10) is a reversible motor (10) and including a motor control for controlling the direction of movement of said motor (10).

4. An assembly as set forth in claim 3 including a control circuit for controlling said switching circuit (22) and said motor control (30).

5. An assembly as set forth in claim 4 including a position feedback circuit (32) for sensing the position of said transmission (12) and feeding a signal to said central control circuit (16).

6. An assembly as set forth in claim 2 wherein said super capacitor (20) has an energy capacity sufficient to actuate said motor (10) independently of the battery (24).

7. An assembly as set forth in claim 1 including a battery (24) for charging said capacitor circuit (18) and having a battery supply energy wherein said capacitor circuit (18) has a stored energy capacity sufficient to actuate said motor (10) when frictional forces to shift out of park require more energy than the battery supply energy.

8. An assembly as set forth in claim 1 including a battery (24) for charging said capacitor circuit (18) wherein said capacitor circuit (18) has a stored energy capacity sufficient to actuate said motor (10) when said battery (24) is discharged.

9. A method of shifting the transmission (12) of a vehicle having a battery (24) between park and various shift positions with a reversible motor (10) comprising the steps of;

supplying electrical energy from the battery (24) to the motor (10) to shift the transmission (12) in response to a shift selection (14), storing electrical energy in a super capacitor (20);

transmitting the electrical energy stored in the capacitor (20) to the motor (10) for actuating the motor (10) when additional energy is required to shift the transmission (12) from park to another shift position.

10. A method as set forth in claim 9 further defined as placing the capacitor (20) in parallel with the battery (24) for charging the capacitor (20).

11. A method as set forth in claim 10 further defined as placing the capacitor (20) in series with the battery (24) and the motor (10) to transmit the stored energy of the capacitor (20) to the motor (10).

12. A method as set forth in claim 11 further defined as storing sufficient electrical energy in the capacitor (20) to actuate the motor (10) independently of the battery (24).

13. A method as set forth in claim 9 further defined as charging the capacitor (20) with the battery (24) having a battery supply energy and storing sufficient electrical energy in the capacitor (20) to actuate the motor (10) when the frictional forces to shift out of park require more energy than the battery supply energy.

14. A method as set forth in claim 13 further defined as recharging the capacitor (20) with the battery (24) subsequent to shifting the transmission (12) out of park.

15. A method as set forth in claim 9 further defined as charging the capacitor (20) with the battery (24) and storing sufficient electrical energy in the capacitor (20) to actuate the motor (10) when the battery (24) is discharged.

* * * * *